US012689310B2

(12) United States Patent
Wu et al.

(10) Patent No.: US 12,689,310 B2
(45) Date of Patent: Jul. 21, 2026

(54) ELECTRIFIED VEHICLE WITH ACTIVE DISCHARGE OF HIGH-VOLTAGE BUS

(71) Applicant: Ford Global Technologies, LLC, Dearborn, MI (US)

(72) Inventors: Hongjie Wu, Canton, MI (US); Yuqing Tang, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 367 days.

(21) Appl. No.: 17/961,733

(22) Filed: Oct. 7, 2022

(65) Prior Publication Data

US 2024/0120851 A1 Apr. 11, 2024

(51) Int. Cl.
| | |
|---|---|
| *B60L 15/20* | (2006.01) |
| *H02J 7/00* | (2026.01) |
| *H02J 7/90* | (2026.01) |
| *H02M 3/158* | (2006.01) |
| *H02M 7/539* | (2006.01) |
| *B60L 50/60* | (2019.01) |

(52) U.S. Cl.
CPC ............. *H02M 7/539* (2013.01); *B60L 15/20* (2013.01); *H02J 7/933* (2026.01); *H02M 3/1582* (2013.01); *B60L 50/60* (2019.02); *H02J 2207/20* (2020.01)

(58) Field of Classification Search
CPC .... H02M 7/539; H02M 3/1582; H02M 1/007; H02M 1/322; H02M 7/5387; B60L 15/20; B60L 50/60; B60L 3/04; H02J 7/00712; H02J 2207/20; Y02T 10/70

USPC .......... 307/9.1, 10.1, 64, 109, 110; 320/118, 320/166, 167; 318/139; 701/22
See application file for complete search history.

(56) References Cited

U.S. PATENT DOCUMENTS

| | | | |
|---|---|---|---|
| 8,378,528 | B2 | 2/2013 | Jang et al. |
| 8,729,864 | B2 | 5/2014 | Dittmer et al. |
| 9,041,329 | B2 | 5/2015 | Zhang et al. |
| 9,470,739 | B2 | 10/2016 | Govindaraj et al. |
| 9,656,556 | B2 | 5/2017 | Syed et al. |
| 10,035,422 | B2 | 7/2018 | Zhou et al. |
| 10,384,561 | B2 | 8/2019 | Yang et al. |
| 10,773,601 | B2 * | 9/2020 | Curuvija ........... H02M 7/53871 |
| 2011/0241581 | A1 | 10/2011 | Flock et al. |
| 2021/0104958 | A1 * | 4/2021 | Hiranuma ............... H02M 1/32 |
| 2022/0052602 | A1 * | 2/2022 | Jin ........................ H02J 7/0029 |
| 2023/0264577 | A1 * | 8/2023 | Lu ......................... H02M 1/007 |
| | | | 307/10.1 |

* cited by examiner

*Primary Examiner* — Elim Ortiz
(74) *Attorney, Agent, or Firm* — David B. Kelly; Brooks Kushman P.C.

(57) ABSTRACT

An electrified vehicle includes an active discharge system having a plurality of resistors connected in parallel, a switch connected in series with the plurality of resistors with the switch and the plurality of resistors connected across positive and negative legs of a high-voltage DC bus, and a controller coupled to the switch and programmed to close the switch in response to a vehicle shutdown signal, and in response to voltage of the DC bus exceeding a first threshold after a predetermined elapsed time from closing the switch, open the switch. The controller may also open the switch when the voltage of the DC bus is below a second threshold.

20 Claims, 3 Drawing Sheets

ELECTRIFIED VEHICLE WITH ACTIVE DISCHARGE OF HIGH-VOLTAGE BUS

TECHNICAL FIELD

This disclosure relates to a parking mechanism including a parking gear and parking pawl assembly angularly oriented relative to the rotor of an electric machine powered by an inverter in an electrified vehicle.

BACKGROUND

An electrified vehicle such as a hybrid-electric vehicle (HEV) or all-electric vehicle (EV) has a high voltage (HV) traction battery to store and provide energy to an electric machine for vehicle propulsion. The electric machine is typically a three-phase AC machine connected to an inverter powered by the HV battery that converts the power from DC to AC and may include one or more capacitors. During key-off or other situations, it may be desirable to discharge the capacitor(s) associated with the DC bus and inverter.

SUMMARY

In various embodiments, an electrified vehicle includes a plurality of resistors connected in parallel and a switch connected in series with the plurality of resistors. The switch and the plurality of resistors are connected across positive and negative legs of a high-voltage DC bus. A controller is coupled to the switch and programmed to close the switch in response to a shutdown signal, and in response to voltage of the DC bus exceeding a first threshold after a predetermined elapsed time from closing the switch, open the switch. The switch may be a normally-closed switch that opens in response to a signal from the controller and closes in response to no signal from the controller. The controller may be further programmed to open the switch in response to the voltage of the DC bus being below a second threshold, the second threshold lower than the first threshold. In one embodiment, the second threshold corresponds to 60 VDC. The controller may be further programmed to open the switch in response to the voltage of the DC bus being below the second threshold after a predetermined elapsed time from closing the switch.

In one or more embodiments, the electrified vehicle includes a DC bus capacitor connected across the positive and negative legs of the DC bus. The plurality of resistors and the switch may be connected in parallel with the DC bus capacitor. The electrified vehicle may include a traction battery, a voltage converter connected to the traction battery, an inverter connected to the voltage converter, a DC bus capacitor connected across the plurality of resistors and the switch, and an electric machine connected to the inverter, wherein the plurality of resistors and the switch are connected to the DC bus between the traction battery and the inverter.

Embodiments also include a method for controlling an electrified vehicle. The method may include, by a vehicle controller, connecting a plurality of resistors connected in parallel across positive and negative legs of a high voltage DC bus in response to receiving a vehicle shutdown request, and disconnecting the plurality of resistors from across the positive and negative legs in response to voltage of the DC bus exceeding a first threshold after a predetermined elapsed time from receiving the vehicle shutdown request. In various embodiments, connecting the plurality of resistors comprises controlling a switch connected in series with the plurality of resistors. Controlling the switch may include applying a control signal to close the switch. Disconnecting the plurality of resistors may include applying a control signal to open the switch. The method may include disconnecting the plurality of resistors when the voltage of the DC bus is below a second threshold, such as 60 VDC.

A system according to one or more embodiments may include a traction battery connected to a DC bus, a DC bus capacitor connected across positive and negative legs of the DC bus, a plurality of resistors connected in parallel to one another, the plurality of resistors connected in series with a switch, the plurality of resistors and the switch connected across the DC bus capacitor, and a controller configured to control the switch to discharge voltage of the DC bus capacitor through the plurality of resistors for a predetermined time if the voltage of the DC bus is greater than a first threshold, or until the voltage of the DC bus is less than a second threshold lower than the first threshold. The second threshold may be 60 VDC. The system may include a voltage converter connected to the traction battery, an inverter connected to the voltage converter, and an electric machine connected to the inverter, wherein the plurality of resistors and the switch are connected to the DC bus between the traction battery and the inverter. The switch may be a normally closed switch. The controller may be configured to control the switch to discharge the voltage of the DC bus in response to receiving a vehicle shutdown signal. The controller may be configured to generate a signal to open the switch until receiving the vehicle shutdown signal, with the switch being a normally closed switch.

One or more embodiments according to the disclosure may have associated advantages. For example, embodiments may reduce energy loss during vehicle operation while protecting the active discharge circuitry during traction battery charging. Various embodiments allow the inverter high voltage bus to be energized during battery charging while eliminated the need of an additional auxiliary contactor for the battery charger. In addition, the active discharge circuit control strategy according to the disclosure may eliminate the need to supply low voltage to the inverter during battery charging, which reduces low voltage energy loss and may extend useful life of the inverter.

DETAILED DESCRIPTION

Figure 1:
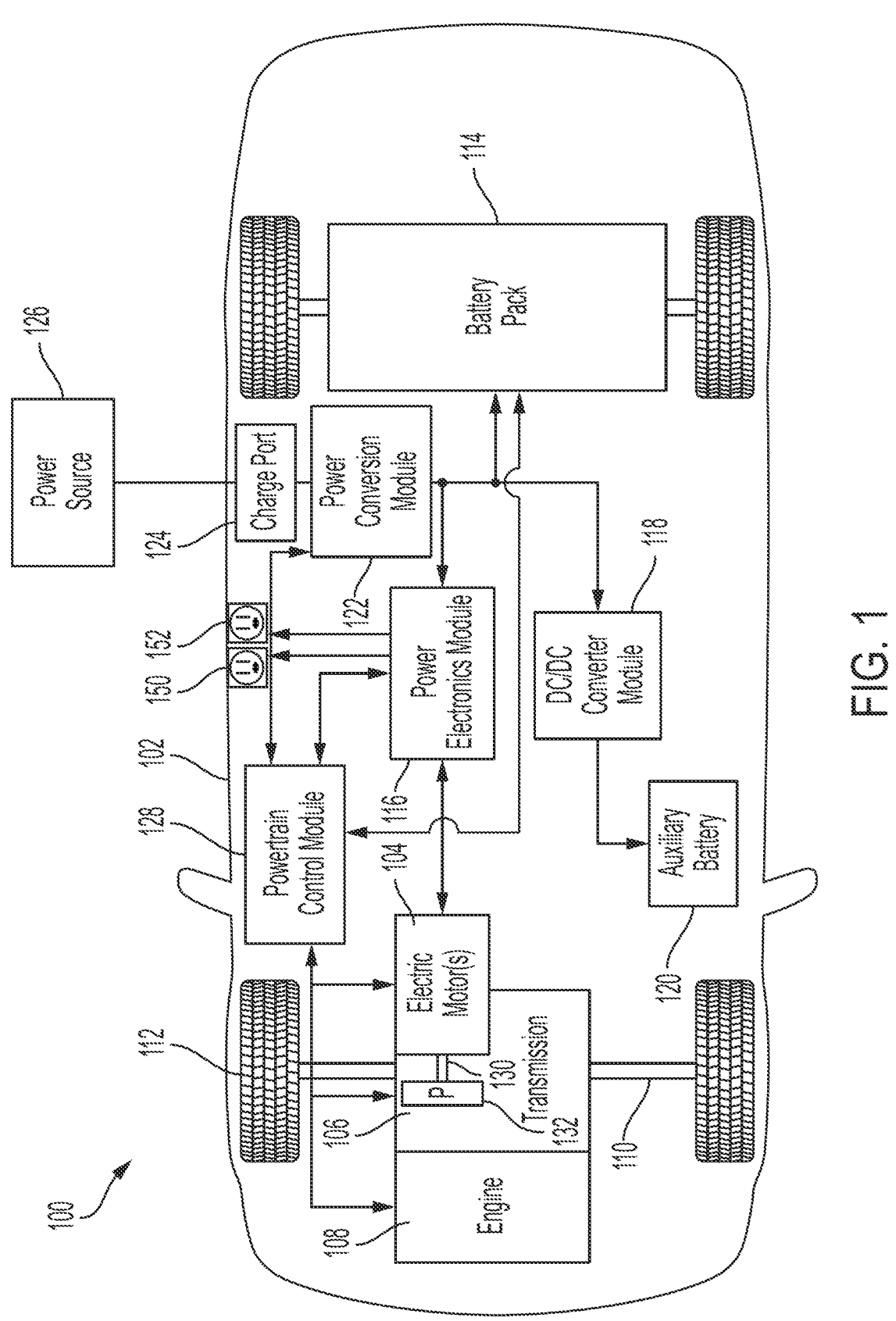
FIG. 1 is block diagram of an electrified vehicle implemented as a hybrid-electric vehicle having active discharge control according to the disclosure.

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

The present inventors have recognized that in electrified vehicles with higher power and torque in demand, the inverter DC bus voltage may be significantly higher than the traction battery voltage, such as increasing from 400V to 800V, for example. This presents challenges to meet the desired discharge time to quickly reduce the DC bus voltage to a low voltage level, such as below 60V, upon vehicle shutdown or various other situations. To meet the desired discharging time, embodiments according to the disclosure replace a more conventional passive discharge resistor with an active discharge system including a controlled switch connected in series with a number of lower resistance discharge resistors. The switch is controlled by a vehicle controller to reduce the discharge time (switch ON) while also reducing energy loss and heat generation during normal operation (switch OFF) that may otherwise provide cooling challenges. The active discharge system may function with only HV present and without LV power to cover various situations where loss of LV power may occur.

However, for various configurations of BEV and PHEV vehicles, the inverter HV DC bus is energized during vehicle charging, but no LV power provided to the inverter to reduce energy loss and extend the use life of the inverter. Turning the active discharge circuit ON during battery charging would consume higher energy loss and could overload the active discharge circuit. As such, various embodiments according to the disclosure monitor the DC bus voltage after active discharge operation starts and control the discharge switch ON/OFF depending on the DC bus voltage. If the DC bus voltage drops below a corresponding threshold or by a specified amount within a given specified short duration, this indicates that an external charging source is not connected so that the active discharge continues until the voltage is below a second threshold, such as 60V. Otherwise, if the DC bus voltage does not decrease significantly after the active discharge is initiated, this indicates that the vehicle is in charging mode, and the active discharge operation will be stopped immediately.

Figure 2:
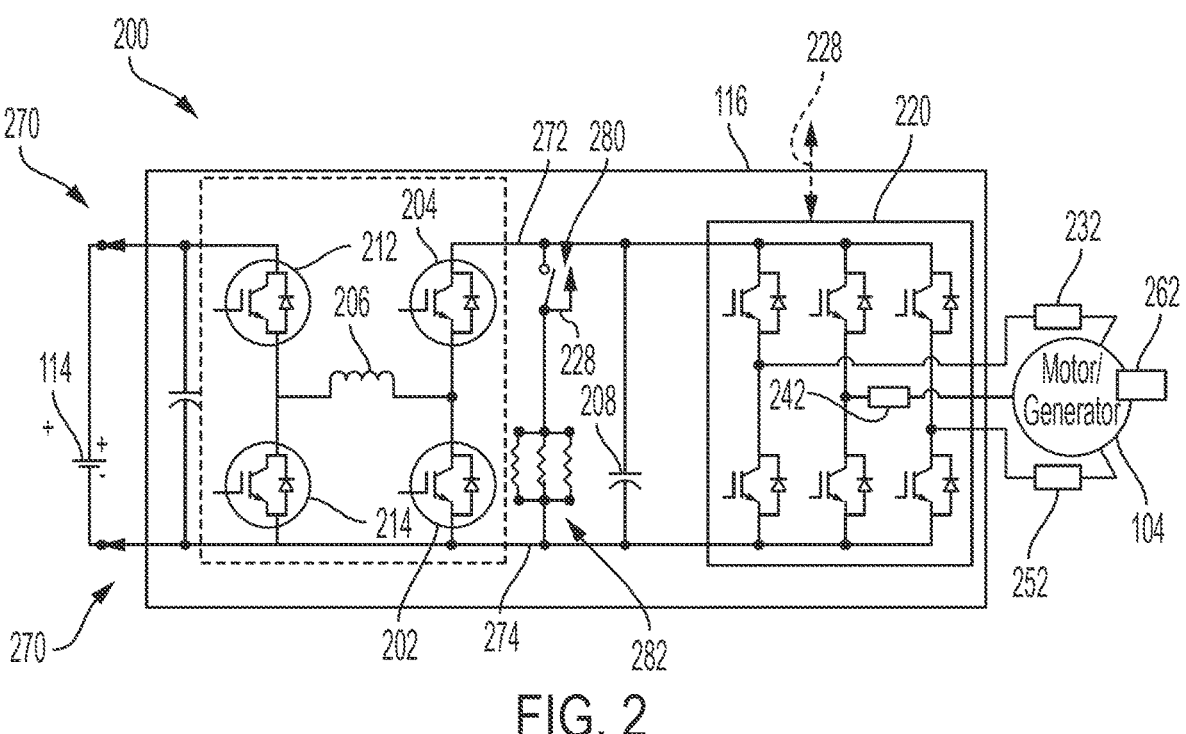
FIG. 2 is a simplified electrical system of an electrified vehicle having an active discharge system controlled according to the disclosure.

FIG. 1 depicts an example of an electrified vehicle 100 implemented as a plug-in hybrid-electric vehicle. The electrified vehicle 100 may comprise one or more multi-phase electric machines 104 having an output shaft 130 mechanically connected to a parking mechanism (P) 132 of a transmission 106. In addition, the transmission 106 is mechanically connected to an engine 108 for hybrid implementations. The parking mechanism (P) 132 of transmission 106 is mechanically connected to a drive shaft 110 that is mechanically connected to the wheels 112. The parking mechanism (P) 132 includes a parking gear with gaps and teeth and a parking pawl that may selectively engage the parking gear when the vehicle gear selector is in Park to prevent the electric machine output shaft 130 and connected vehicle drive shaft 110 from rotating. The electric machines or motor/generators 104 can provide propulsion whether the engine 108 is turned on or off. The electric machines 104 can also provide regenerative braking. The electric machines 104 may operate as motors, generators, or both and can provide fuel economy benefits by recovering energy that would normally be lost as heat. Electrified vehicle 100 may also be implemented as a battery electric vehicle without an engine 108 and powered solely by traction battery 114 via an inverter as represented in FIG. 2, for example.

Traction battery or battery pack 114 stores energy that can be used by the electric machines 104. A vehicle battery pack 114 typically provides a high voltage (HV) DC output provided by connecting hundreds of low voltage cells together. The battery pack 114 is electrically connected to a power electronics module 116. The power electronics module 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The power electronics module 116 may convert the DC voltage to a three-phase AC current as required by the electric machines 104 and may also be referred to as an inverter in various applications. In a regenerative mode, the power electronics module 116 will convert the three-phase AC current from the electric machines 104 acting as generators to the DC voltage required to recapture energy in the battery pack 114. In various embodiments of the present disclosure, power electronics module 116 includes an active discharge system as illustrated and described in greater detail with respect to FIGS. 2 and 3.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V, 24V, or 48V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122, sometimes referred to as a charger or charging module. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. As previously described, control of the active discharge system according to the present disclosure monitors the DC bus voltage to detect whether the vehicle is charging so that the active discharge system does not remain activated during vehicle charging. The vehicle engine, transmission, electric machines, battery, power conversion, power electronics, and various other control modules, components, or systems may be controlled by one or more controllers that may be referred to as a powertrain control module (PCM) 128. Alternatively, or in combination, various systems or subsystems may include associated control modules or controllers in communication with PCM 128 over a vehicle wired or wireless network to provide coordinated control of the vehicle.

FIG. 2 illustrates a traction battery 114 coupled to a power electronics module 116 connected to a multi-phase electric machine 104, implemented by a three-phase electric machine in a representative electrified vehicle 100. One or more contactors or high voltage switches 270 controlled by an associated controller, such as powertrain control module 128, may be operated to selectively connect battery voltage from battery 114 to power electronics module 116 after completing various diagnostic routines in response to a vehicle start. These high voltage switches may be implemented by relays, insulated gate bipolar junction transistors (IGBTs), metal oxide semiconductor field effect transistors (MOSFETs), bipolar junction transistors (BJTs), and/or other electro-mechanical or solid state switches. The system may include a pre-charge circuit (not shown) to limit the current flow from battery 114 while the system is powering up.

Power electronics module 116 may include a voltage converter (sometimes referred to as a variable voltage converter or VVC) 200 having buck-boost converter circuitry upstream of inverter components 220 to drive one or more electric machines 104. The power electronics module 116 may include a boost circuit with an inductor 206, a switch 212 to charge an electric field in the inductor 206, and a switch 214 to discharge the electric field and change the voltage to drive the motor/generator 104. The voltage converter 200 may also include a buck circuit using inductor 206 and switches 202 and 204. This DC/DC voltage converter will convert the battery voltage to an operational voltage which may be greater than the battery terminal voltage. In one example, traction battery 114 may have a nominal voltage of 400 VDC that is boosted by the voltage converter 200 to a DC bus voltage of 800 VDC. The buck-boost power converter 200 may use IGBTs, BJTs, MOSFETs, relays, or other electro-mechanical or solid-state switches. The use of IGBTs with Fast Recovery Diodes (FRDs) in this diagram is exemplary and may be accomplished using MOSFETs, BJTs, or other electro-mechanical or solid-state switches. One or more capacitors, represented by capacitor 208 may be used to filter the voltage generated by the voltage converter 200 so that the operational voltage applied to the inverter 210 is generally stable. Capacitor 208 may be referred to as a DC link capacitor and is connected across the positive leg 272 and negative leg 274 of the HV DC bus.

As previously described, inverter 220 converts the DC voltage/current to a three-phase AC voltage/current provided to electric machine 104. Inverter 220 communicates with an associated controller as indicated at 228 to operate the corresponding switches of the inverter to generate an AC waveform at a commanded voltage from the DC voltage/current provided by the traction battery 114 with an upper and lower switching pair associated with each phase. Electric machine 104 may include a resolver or other rotational position sensor 262 that provides a corresponding signal indicative of rotational position of the rotor of electric machine 104. The rotational position sensor 262 may communicate with an associated controller or processor that performs feedback control of rotor position and related current commands for inverter 220 to deliver to each phase of electric machine 104 to control associated torque.

Power electronics module 116 includes an active discharge system that includes a controllable switch 280 in communication with an associated controller as indicated at 228, connected in series with a plurality of resistors 282 connected in parallel. Switch 280 and resistors 282 are connected across the positive 272 and negative 274 legs of the HV DC bus. Stated differently, the switch 28 and resistors 282 are connected in parallel with, or across, DC link capacitor 208 between traction battery 114 and inverter 220, or more specifically between converter 200 and inverter 220. Switch 280 may be implemented by any of a number of transistor-based switches, relays, electromechanical or solid state switches. Switch 280 may be configured as a normally-open (N.O.) switch that requires a control signal or voltage from the controller to close, or as a normally closed (N.C.) switch that requires a control signal or voltage from the controller to open. A normally closed switch may be used to provide active discharge in the absence of a LV control signal.

During vehicle shutdown initiated by a key-off or other situations of electrified vehicle 100, it is desirable to discharge the capacitor(s) 208 inside the power electronics module 116 that powers the electric machine 104 to reduce the voltage on the HV DC bus below a desired level (such as 60 VDC) within a specified time. As such, the controller operates switch 280 to close (by applying a control signal to a N.O. switch configuration, or removing a control signal from a N.C. switch configuration) allowing current to flow through resistors 282 to quickly reduce the voltage across the positive and negative legs 272, 274 of the DC bus as illustrated and described in greater detail with respect to FIG. 3.

Figure 3:
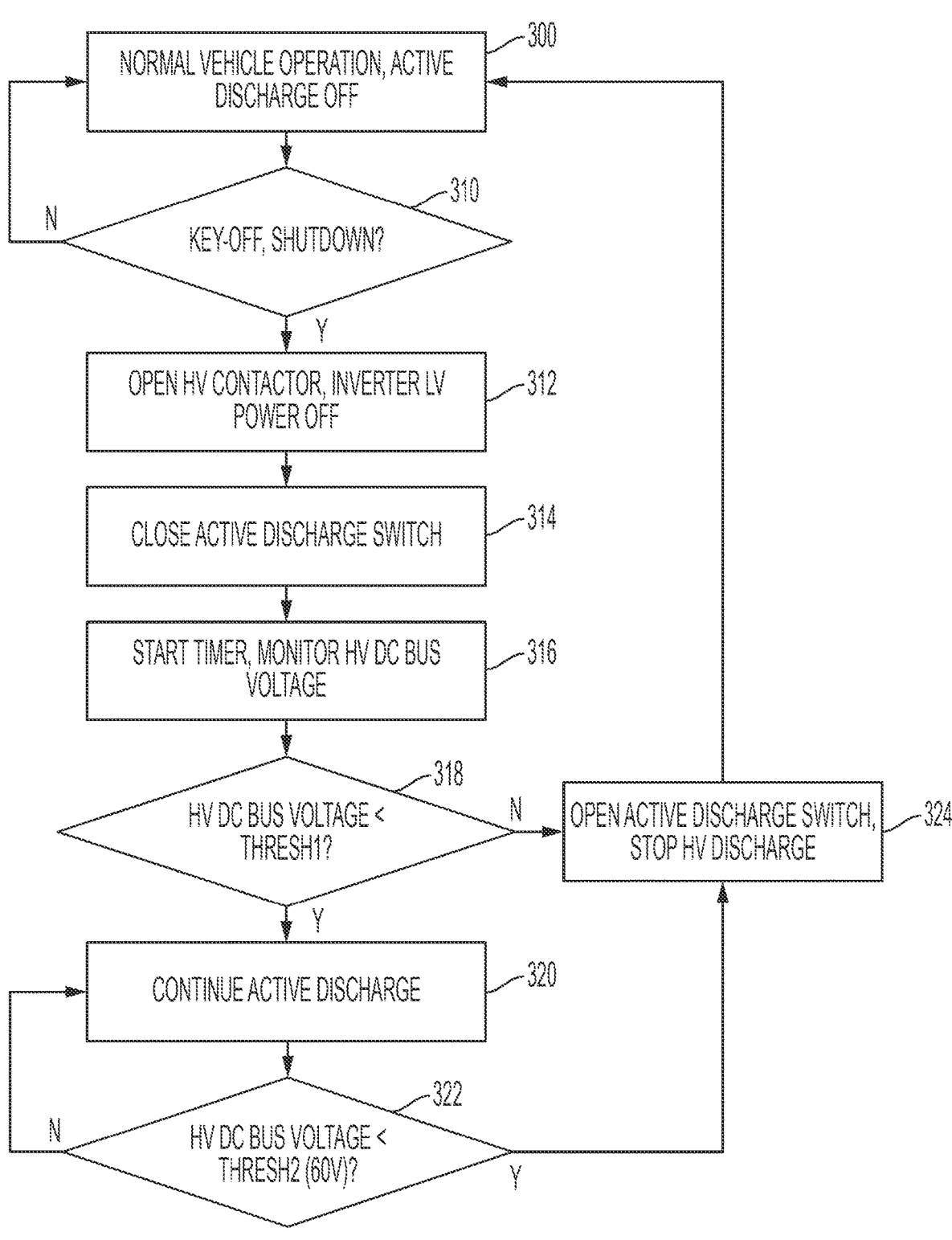
FIG. 3 is a flow chart illustrating operation of a system or method for controlling an active discharge system of an electrified vehicle according to the disclosure.

Block 300 of FIG. 3 represents normal operation with the active discharge system off and the switch connecting the plurality of resistors across the HV DC bus open. As previously described, a N.O. switch configuration does not require a signal from the controller, while a N.C. switch configuration requires a signal from the control to keep the switch open. Block 310 represents a key-off or other event that triggers a vehicle shutdown. In response to a vehicle (or electrical system) shutdown, the controller opens the HV contactor and LV power to the inverter is switched off as represented at 312. The controller then closes the active discharge switch as represented at 314 and starts a timer while monitoring the HV DC bus voltage as represented at 316. Block 318 determines whether the HV DC bus voltage is below a first threshold. Alternatively, block 318 may determine whether the delta or change in HV DC bus voltage exceeds an associated threshold within a designated time from closing the active discharge switch at 314 as indicated by the timer of 316.

If the HV DC bus voltage has not dropped below the threshold within the designated time, then the controller opens the active discharge switch and stops the HV bus discharge as represented at 324 as this may be indicative that the vehicle is in charge mode with an external voltage source connected. Otherwise, the active switch remains closed and active discharge continues at 320 until the HV DC bus voltage is below a second threshold, such as 60 VDC as represented at 322.

The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components. While the algorithms, processes, methods, or steps may be illustrated and/or described in a sequential matter, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electrified vehicle comprising:
a plurality of resistors connected in parallel;
a switch connected in series with the plurality of resistors, the switch and the plurality of resistors connected across positive and negative legs of a high-voltage DC bus; and
a controller coupled to the switch and programmed to:
close the switch in response to a shutdown signal; and
in response to voltage of the DC bus exceeding a first threshold after a predetermined elapsed time from closing the switch, open the switch.

2. The electrified vehicle of claim 1 wherein the switch comprises a normally-closed switch that opens in response to a signal from the controller and closes in response to no signal from the controller.

3. The electrified vehicle of claim 2 wherein the controller is further programmed to open the switch in response to the voltage of the DC bus being below a second threshold, the second threshold lower than the first threshold.

4. The electrified vehicle of claim 3 wherein the second threshold corresponds to 60 VDC.

5. The electrified vehicle of claim 3 wherein the controller is further programmed to open the switch in response to the voltage of the DC bus being below the second threshold after a predetermined elapsed time from closing the switch.

6. The electrified vehicle of claim 1 further comprising:
a DC bus capacitor connected across the positive and negative legs of the DC bus.

7. The electrified vehicle of claim 6 wherein the plurality of resistors and the switch are connected in parallel with the DC bus capacitor.

8. The electrified vehicle of claim 1 further comprising:
a traction battery;
a voltage converter connected to the traction battery;
an inverter connected to the voltage converter;
a DC bus capacitor connected across the plurality of resistors and the switch; and
an electric machine connected to the inverter, wherein the plurality of resistors and the switch are connected to the DC bus between the traction battery and the inverter.

9. A method for controlling an electrified vehicle, comprising, by a vehicle controller:
connecting a plurality of resistors connected in parallel across positive and negative legs of a high voltage DC bus in response to receiving a vehicle shutdown request; and
disconnecting the plurality of resistors from across the positive and negative legs in response to voltage of the DC bus exceeding a first threshold after a predetermined elapsed time from receiving the vehicle shutdown request.

10. The method of claim 9 wherein connecting the plurality of resistors comprises controlling a switch connected in series with the plurality of resistors.

11. The method of claim 10 wherein controlling the switch comprises applying a control signal to close the switch.

12. The method of claim 10 wherein disconnecting the plurality of resistors comprises applying a control signal to open the switch.

13. The method of claim 9 further comprising disconnecting the plurality of resistors when the voltage of the DC bus is below a second threshold.

14. The method of claim 13 wherein the second threshold is 60 VDC.

15. A system comprising:
a traction battery connected to a DC bus;
a DC bus capacitor connected across positive and negative legs of the DC bus;
a plurality of resistors connected in parallel to one another, the plurality of resistors connected in series with a switch, the plurality of resistors and the switch connected across the DC bus capacitor; and
a controller configured to control the switch to discharge voltage of the DC bus capacitor through the plurality of resistors for a predetermined time responsive to voltage of the DC bus being greater than a first threshold, and to stop discharging voltage of the DC bus responsive to the voltage of the DC bus being less than a second threshold lower than the first threshold.

16. The system of claim 15 wherein the second threshold is 60 VDC.

17. The system of claim 15 further comprising:
a voltage converter connected to the traction battery;
an inverter connected to the voltage converter; and
an electric machine connected to the inverter, wherein the plurality of resistors and the switch are connected to the DC bus between the traction battery and the inverter.

18. The system of claim 17 wherein the switch comprises a normally closed switch.

19. The system of claim 15 wherein the controller is configured to control the switch to discharge the voltage of the DC bus in response to receiving a vehicle shutdown signal.

20. The system of claim 19 wherein the controller is configured to generate a signal to open the switch until receiving the vehicle shutdown signal.

* * * * *